Patented Jan. 10, 1928.

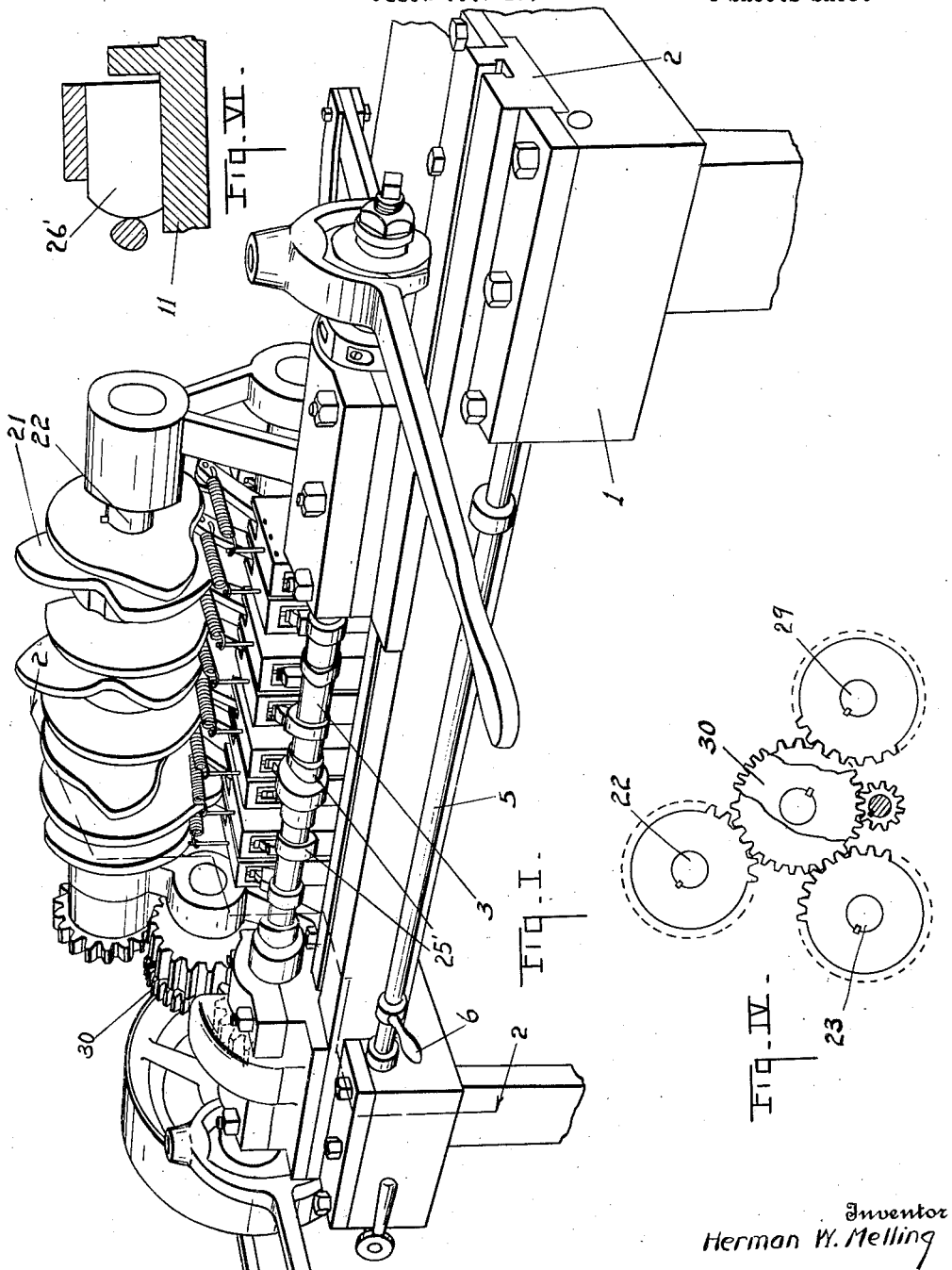

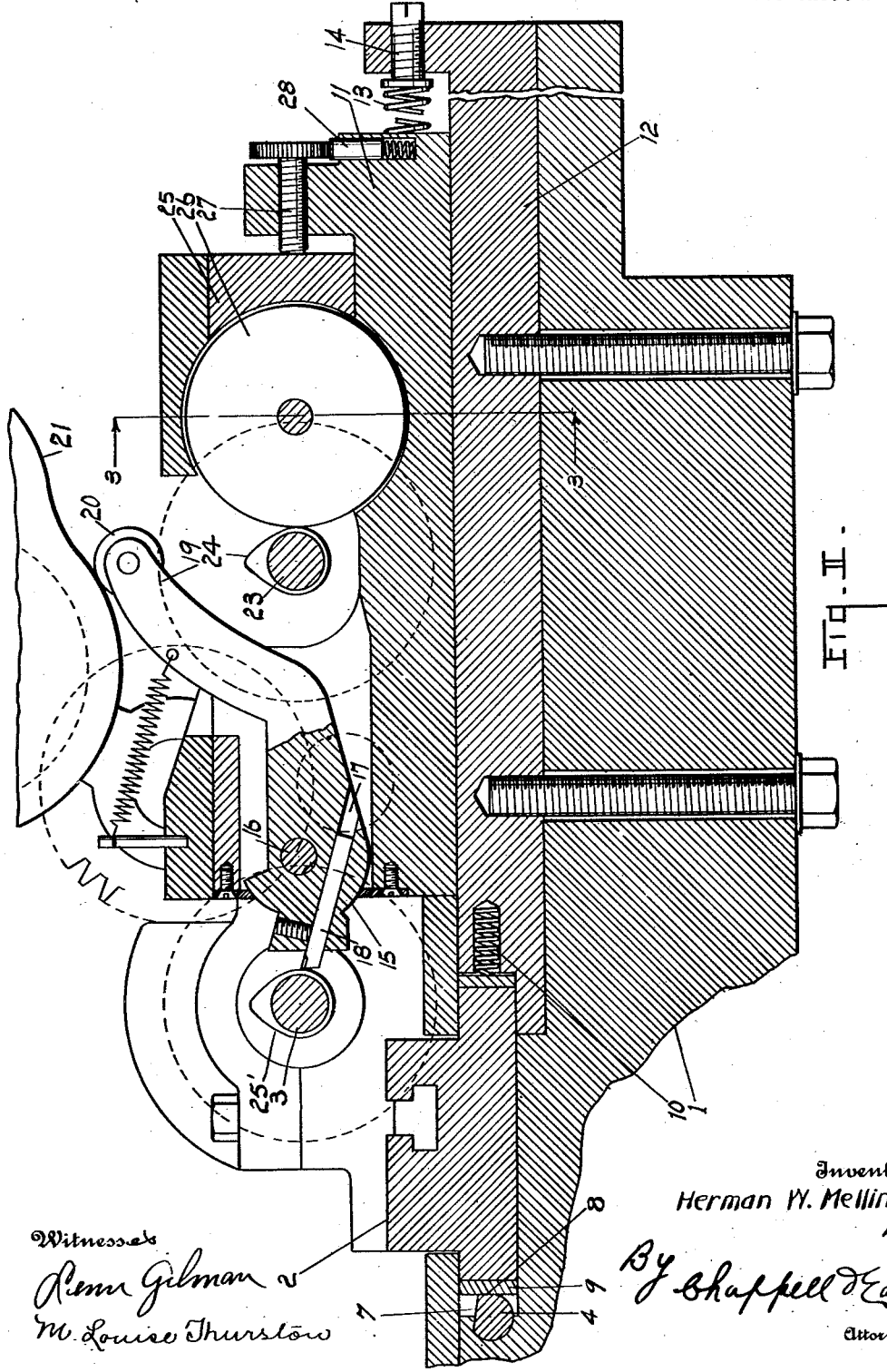

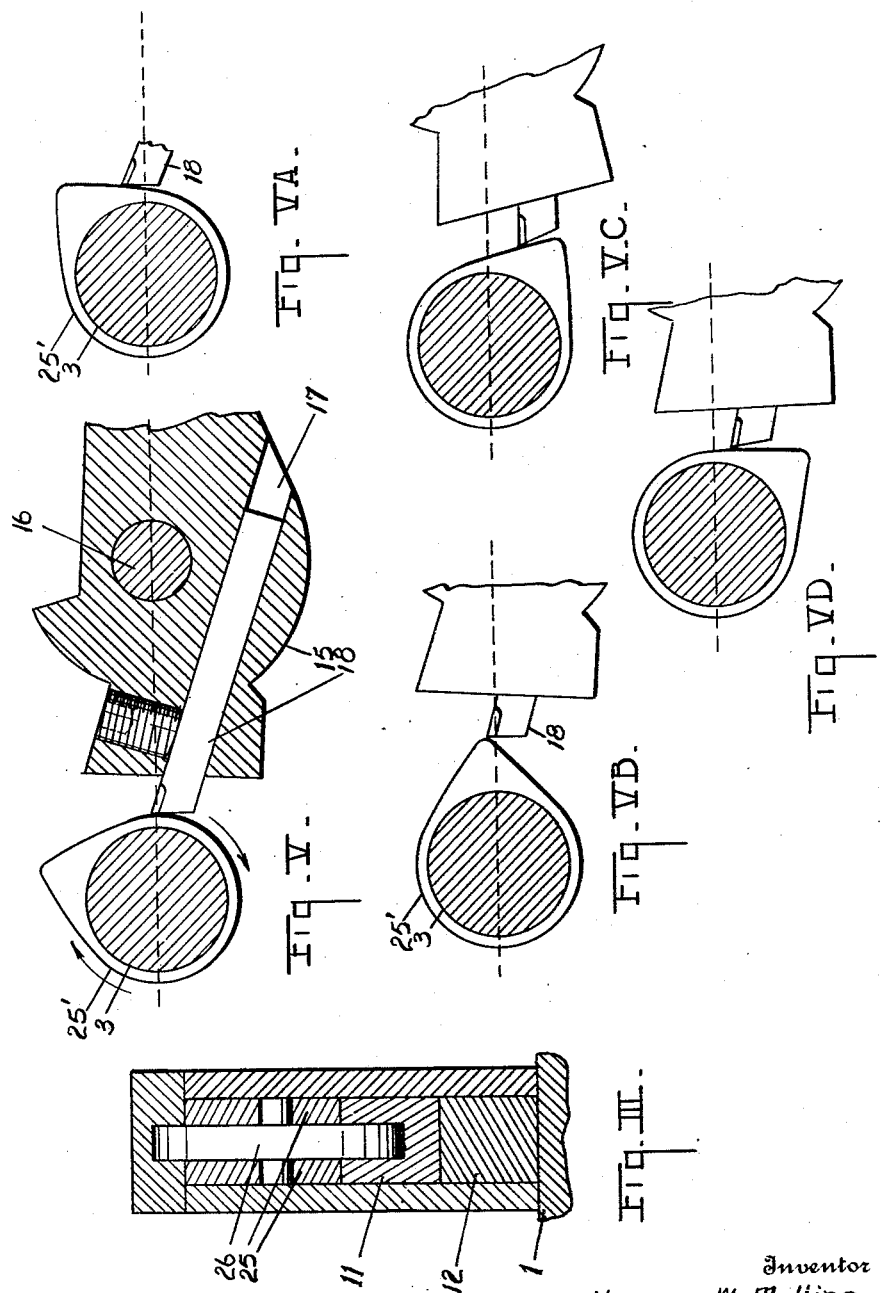

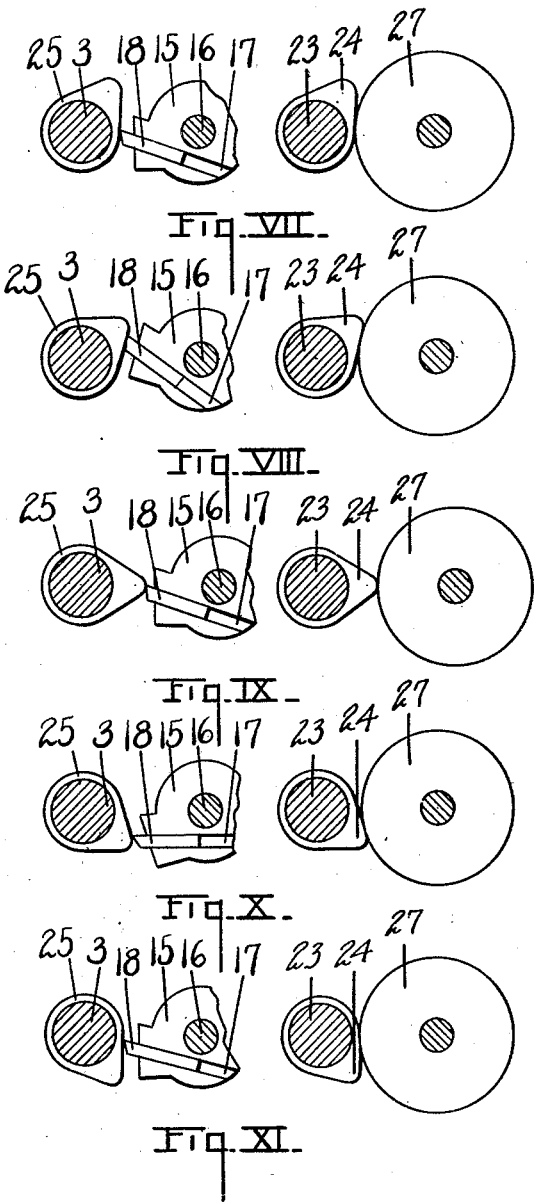

1,655,655

UNITED STATES PATENT OFFICE.

HERMAN W. MELLING, OF JACKSON, MICHIGAN.

LATHE.

Application filed October 13, 1920. Serial No. 416,750.

This invention relates to improvements in lathes. The main objects of this invention are:

First, to provide an improved lathe for the manufacture of cam shafts.

Second, to provide an improved lathe for the manufacture of cam shafts by means of which cam shafts may be rapidly and accurately produced.

Third, to provide an improved lathe of the class described in which the cam shafts produced require but little finish grinding.

Fourth, to provide an improved cam forming machine in which the tool is automatically adjusted to maintain its proper relation to the work as the work is revolved.

Fifth, to provide an improved cam forming machine of large capacity.

Sixth, to provide an improved machine of the class described which is comparatively simple in its parts, very durable and not likely to get out of repair in use.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a front detail perspective view of a structure embodying features of my invention. Fig. II is a detail view, mainly in transverse vertical section on the line corresponding to line 2—2 of Fig. I, certain parts being shown in full lines for convenience in illustrating. Fig. III is a detail section on a line corresponding to line 3—3 of Fig. II. Fig. IV is a detail view of the driving connections for the work, and the pattern cam shaft and tool control shaft. Figs. V, V$^A$, V$^B$, V$^C$ and V$^D$ are enlarged detail views illustrating the relation of the tool to the work in several positions thereof. Fig. VI is a detail section corresponding to Fig. II showing a modified form of carriage abutment or thrust member. Figs. VII, VIII, IX, X and XI are detail views illustrating the relative relation of the master cam to its abutment and the tool to the work in several positions thereof.

In the drawing similar reference characters refer to similar parts throughout the several views, and the sectional views are taken looking in the direction of the little arrows at the ends of the section lines.

Referring to the drawing the bed 1 is provided with a suitable way for the work carriage 2. The work carriage is provided with suitable chucks for the work 3 which in the structure illustrated is a valve cam shaft for an internal combustion engine. The structural details of the work carriage and its feed means and of the chucks are not illustrated as such details form no part of my present invention.

The work carriage is preferably supported for lateral adjustment to regulate the cut. (See Fig. II.) This adjustment is effected by means of the cams 4 upon rock shaft 5 extending across the front of the machine and provided with a hand piece 6. These cams have two faces 7 and 8 (See Fig. II) which coact with thrust plates 9 on the carriage. Springs 10 hold the carriage yieldingly forward. In operation the first cut is taken with the cam face 7 against the thrust plate, and the second or finishing cut is taken with the cam face 8 against the thrust plate which shifts the carriage laterally and holds it in position for the second cut without adjusting the tools.

For each cam to be cut on the cam shaft I provide a tool carriage 11 supported on a slide 12 for movement laterally of the work. The spring 13, the tension of which may be adjusted by means of the screw 14, holds or urges the tool carriage toward the work. The tool holder 15 is pivotally mounted at 16 and provided with a seat 17 for the tool 18. The tool holder is provided with an upwardly and rearwardly projecting arm 19 having a roller 20 travelling on the tool holder control cam 21. These cams 21 are mounted on shaft 22 disposed above the tool holder carriages, there being a control cam for each tool holder.

I provide a master or pattern cam shaft 23 having cams 24 thereon of the same shape as the cams 25' to be cut on the cam shaft 3. The cams 24 control the movement of the tool holder carriages 11, each carriage being provided with a thrust member 25 having thrust or abutment rollers 26 coacting with the cams 24. These thrust members are adjustably supported by means of the screws 27, detent 28 being provided for holding these screws in their adjusted positions.

The cam shafts 23 and the work spindle 29 are driven at the same speed by means of the driving gear 30. (See Fig. IV.) The master or pattern cams 24 which are replicas of the work control the movements of the tool carriages. It will be noted that the pivot axis of each tool on its holder is substantially spaced from its point so that the cutting edge of the tool swings in a substantial arc transversely to the travel of the tool carriage. This swinging of the tool on its pivot is an essential feature in reproducing the pattern or master cam. The cam 21 acting on the tool holder maintains the tool 18 in its proper relation to the work as the carriage is reciprocated and as the work revolves. This travel or swinging movement of the tool holder is illustrated in Figures V to V$^D$ inclusive, and also in the Figures VII to X inclusive. To secure this result most efficiently, it is desirable that the radius of the thrust roller 26 should correspond to the radius of the tool. The tool is oscillated on its axis so that the point of engagement of its cutting edge with the work corresponds to the point of engagement of the master cam with its abutment.

It is understood that in order for tools of this type to cut most effectively, the tools must be presented to the work at approximately a proper cutting angle, and this results from the control or actuation of the carriage and tool as described.

In the preferred embodiment illustrated I provide the thrust rollers 26. In the modification illustrated in Fig. VI the thrust members 26' having curved surfaces corresponding to that of rollers are provided. The rollers, however, have the advantage of reducing friction and wear.

With the parts thus arranged I provide a structure by means of which cam shafts may be rapidly and accurately manufactured with a minimum of attention on the part of the operator.

The tools being properly presented to the work at all times the work comes from the machine in a manner requiring very little finish grinding. By the adjustment of the work carriage laterally a rough cut may be taken and the work carriage adjusted for a finish cut which is a further advantage in producing a substantially finished product.

Another advantage that the construction has is that the pattern cams are exact duplicates of the cams to be cut enabling the use of stock cams as patterns, and the tool holder control cams may be laid out by adjusting the tool holder to the various positions in which it would lie in relation to the work as illustrated in Figs. V to V$^D$ inclusive.

It will be observed that the axes of the work, tool holder, the master cam and its abutment are in the same plane and in a plane parallel with the path of movement of the tool carriage. The radius of the abutment surface and the radius of the arc of the cutting edge of the tool are substantially the same. The tool holder is oscillated by means of its control cam so that the cutting edge of the tool with the work and the point of contact of the abutment with the master cam maintains the same relative relation, which results in the work being an exact duplicate of the master cam and also in maintaining the proper angle of the cutter relative to the work.

I have illustrated and described my improvements in an embodiment designed for the cutting of valve cam shafts in which all of the cams are of the same shape.

While my improvements are well adapted for a plurality of cams simultaneously they are also adapted for cutting single cams.

I have not attempted to illustrate or describe the various modifications and adaptations which I contemplate as I believe the disclosures made will enable those skilled in the arts to which my invention relates to embody or adapt same as may be desired.

Having thus described my invention, which I claim as new and desire to secure by Letters Patent is:

1. In a cam shaft cutter, the combination of a work carriage, a plurality of tool carriages movable laterally of said work carriage, tool holders pivotally mounted on said tool carriages and provided with upwardly and rearwardly projecting arms, tools on said tool holders, a shaft provided with a plurality of master cams corresponding in shape to the work to be cut, springs urging said tool carriages toward the work, thrust members adjustably mounted on said tool carriages and provided with rollers coacting with said master cams, the radius of said rollers corresponding to the radius of the paths of the cutting edges of the tools, a cam shaft provided with plurality of tool control cams cooperating with said tool holder arms to swing the tool holders on their pivots for maintaining the position of the tools relative to the work as the work revolves, and means for driving the work and said master and tool control cams in synchronism.

2. In a cam shaft cutter, the combination of a work carriage, a plurality of tool carriages movable laterally of said work carriage, tool holders pivotally mounted on said tool carriages, tools on said tool holders, a shaft provided with a plurality of master cams corresponding in shape to the work to be cut, springs urging said tool carriages toward the work, thrust members on said tool carriages provided with abutment members having curved surfaces coacting with said cams, the radius of said abutment members corresponding to the radius of the paths of the cutting edges of the tools, a cam shaft provided with plurality of tool control cams cooperating with said tool holders to swing the tool holders on their pivots for maintaining the position of the tools relative to the work as the work revolves, and means for driving the work and said master and tool control cams in synchronism.

3. In a structure of the class described, the combination of a tool carriage, a tool holder pivotally mounted on said tool carriage, a tool on said tool holder, the axis of the tool pivot being substantially spaced from the point of the tool, so that the point of the tool swings in a substantial arc, a tool carriage control cam, which is a replica of the work to be cut, and a tool control cam cooperating with said tool holder for maintaining the position of the tool relative to the work as the work revolves.

4. In a cam shaft cutter, the combination of a work carriage, a tool carriage movable laterally of said work carriage, a tool holder pivotally mounted on said tool carriage, a cutter carried by said tool holder, a master cam corresponding in shape to the work to be cut, a thrust member on said tool carriage provided with a roller coacting with said master cam, the radius of said roller corresponding to the radius of the path of the cutting edge of the tool, and a tool control cam cooperating with said tool holder to swing the tool holder on its pivot for maintaining the position of the cutter relative to the work as the work revolves, the means for driving the work and said master and tool control cams in synchronism.

5. In a cam shaft cutter, the combination of a work carriage mounted for lateral adjustment for determining the depth of cut, a tool carriage movable laterally of said work carriage, a tool holder pivotally mounted on said tool carriage, a tool carried by said tool holder, a tool carriage control cam corresponding in shape to the work to be cut, and a tool control cam for said tool holder.

6. In a structure of the class described, the combination of a work holder, a tool carriage provided with an abutment, a master cam for controlling said carriage coacting with said abutment, a tool holder on said carriage movable in a plane transverse to the path of travel of the carriage, and means actuating said tool holder timed with the actuation of said carriage, so that the path of travel described by the point of the tool is a replica of that at the point of contact of the master cam and abutment.

7. In a structure of the class described, the combination of a rotary work holder, a tool carriage movable to and from the work in a plane transverse to the axis of the work, a tool holder mounted on said carriage, on a relatively fixed axis substantially spaced from the point of the tool and so that the tool swings in a plane transverse to the travel of the carriage, and means for actuating said carriage and oscillating said tool timed with the rotation of the work.

8. In a structure of the class described, the combination of a tool carriage, a tool mounted on said carriage for swinging movement on a relatively fixed pivot the axis of which is spaced from the point of the tool whereby the point of the tool swings in an arc transverse to the travel of the carriage, a pattern cam which is a replica in shape of the work to be cut for controlling said carriage, and means for swinging said tool whereby its cutting position relative to the work is maintained as the work revolves.

9. In a structure of the class described, the combination of a work carriage, a tool carriage reciprocating laterally of said work carriage, a tool holder pivotally mounted on said tool carriage, the pivot of the tool being substantially spaced from the point of the tool, a master cam which is a replica of the work to be cut for reciprocating said tool carriage, the axes of said master cam and tool holder being in the same plane, and a tool control cam for said tool holder whereby the position of the tool relative to the work is maintained as the work revolves.

10. In a structure of the class described, the combination of a work carriage, means for rotatably supporting the work on said work carriage, a tool carriage reciprocating laterally of said work carriage, a tool holder pivotally mounted on said work carriage, a tool carried thereby, a master cam corresponding to the shape of the work to be cut, an abutment roller coacting with said cam to reciprocate said carriage, the radius of the arc described by the cutting edge of the tool and that of the abutment roller being substantially the same, the axes of the work, tool holder, master cam and abutment roller being in the same plane, such plane being parallel to the plane of the path of the carriage, a cam for oscillating said tool holder on its pivot so that the cutting edge of the tool and the point of contact of the master cam and abutment roller are in the same plane which moves across the plane of said axes, and means for driving the work and the master cam at the same speed.

11. In a structure of the class described, the combination of a work carriage, means for rotatably supporting the work on said work carriage, a tool carriage reciprocating laterally of said work carriage, a tool holder pivotally mounted on said work carriage, a tool carried thereby, a master cam corresponding to the shape of the work to be cut, an abutment roller coacting with said cam to reciprocate said carriage, means for oscillating said tool holder on its pivot so that the cutting edge of the tool corresponds to the point of contact of the master cam with the abutment roller, and means for driving the work and the master cam at the same speed.

12. In a structure of the class described, the combination of a reciprocating tool carriage, a master cam corresponding in shape to the work to be cut, an abutment on said carriage having a curved surface coacting with said master cam, a tool holder pivotally mounted on said tool carriage, a tool carried thereby, the radius of the arc described by the edge of the tool and the radius of the abutment face being approximately the same, and means for reciprocating said tool holder so that the path of travel described by its cutting edge corresponds with that at the point of contact of the master cam and abutment.

13. In a structure of the class described, the combination of a reciprocating tool carriage, a tool holder pivotally mounted on said tool carriage, a tool carried thereby, a master cam corresponding to the shape of the work to be cut, an abutment roller coacting with said master cam for controlling said carriage, the radius of said abutment roller being the same as the radius of the arc described by the cutting edge of the tool, and means for oscillating said tool holder so that the point of engagement of the cutting edge of the tool with the work corresponds to the point of contact of the abutment roller and master cam.

14. In a structure of the class described, the combination of a tool carriage provided with a cam abutment, a tool mounted on said carriage for movement in a plane transverse to the plane of the path of the carriage, a master cam which is a replica in shape of the work to be cut coacting with said abutment on said carriage for controlling the carriage, and means for maintaining the position of the tool with the work as the work revolves, so that the point of engagement of the cutting edge of the tool with the work corresponds to the point of engagement of the master cam with said abutment.

15. In a structure of the class described, the combination of a work carriage, means for rotatably supporting the work on said work carriage, a tool carriage reciprocating laterally of said work carriage, a tool holder pivotally mounted on said work carriage, a tool carried thereby, a master cam corresponding to the shape of the work to be cut, an abutment on said carriage coacting with said cam to control the carriage, the axes of the work, tool holder, and cam being in the same plane, means for oscillating said tool holder on its pivot so that its cutting edge engages the work at a point corresponding to the point of contact of the master cam with its abutment.

16. In a structure of the class described, the combination of a reciprocating tool carriage, a tool holder movably mounted on said tool carriage for reciprocating movement transversely of the path of the carriage, a tool carried thereby, a master cam which is a replica in shape of the work to be cut, an abutment on said carriage coacting with said cam to control the carriage, means for oscillating said tool holder so that its cutting edge engages the work at a point corresponding to the point of contact of the master cam with its abutment.

17. In a structure of the class described, the combination of a reciprocating tool carriage, a master cam which is a replica of the work to be cut controlling said carriage, said carriage being provided with an abutment with which said master cam coacts, a tool holder mounted on said carriage, a tool carried thereby, and means for oscillating said tool holder so that it travels transversely to the path of travel of the carriage so that the path described by the cutting edge of the tool corresponds in outline to the path described by the point of contact of the cam and its abutment.

18. In a structure of the class described, the combination of a rotary work holder, a tool carriage reciprocating laterally relative to the axis of the work, a tool holder pivotally mounted on said carriage and having a tool mounted thereon, the pivot axis of the tool being substantially spaced from the tip of the tool, a master cam which is a replica of the work to be cut for controlling the movement of said carriage, and means for oscillating said tool holder on its pivot timed with the rotation of said master cam for shaping the work.

19. In a structure of the class described, the combination of a tool carriage provided with a cam abutment, a tool mounted on said carriage for movement in a plane transverse to the path of the carriage, a master cam which is a replica of the work to be cut coacting with said abutment for controlling the carriage, and means for maintaining the position of the tool with the work as the work revolves so that the point of engagement of its tip with the work corresponds to the point of engagement of the master cam with said abutment.

20. In a structure of the class described, the combination of a tool carriage, a master cam which is a replica of the work to be cut for controlling said carriage, a tool holder pivotally mounted on said carriage, the pivot axis of the tool holder being fixed and substantially spaced from the tip of the tool, and means for swinging said tool on its pivot transversely of the path of travel of the tool, carriage timed with the rotation of said master cam whereby the work produced is a replica of the master cam.

In witness whereof, I have hereto set my hand.

HERMAN W. MELLING.